United States Patent [19]

Sharp

[11] Patent Number: 5,039,367
[45] Date of Patent: * Aug. 13, 1991

[54] METHOD OF FORMING STORAGE TANK SYSTEM HAVING SECONDARY CONTAINMENT CAPABILITY

[76] Inventor: Bruce R. Sharp, 7685 Fields-Ertel Rd., Cincinnati, Ohio 45241

[ * ] Notice: The portion of the term of this patent subsequent to May 2, 2006 has been disclaimed.

[21] Appl. No.: 416,514

[22] Filed: Oct. 3, 1989

Related U.S. Application Data

[60] Division of Ser. No. 165,153, Mar. 7, 1988, Pat. No. 4,871,078, which is a continuation-in-part of Ser. No. 853,974, Apr. 21, 1986, which is a continuation-in-part of Ser. No. 824,680, Jan. 31, 1986, Pat. No. 4,653,312, which is a continuation-in-part of Ser. No. 745,540, Jun. 17, 1985, abandoned, and a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, which is a continuation-in-part of Ser. No. 580,800, Feb. 16, 1984, Pat. No. 4,524,609, which is a continuation-in-part of Ser. No. 544,012, Oct. 21, 1983, abandoned.

[51] Int. Cl.$^5$ .................. B31C 13/00; G01M 3/00
[52] U.S. Cl. .................. 156/169; 156/173; 156/175; 156/185; 156/187; 73/49.2; 220/466; 220/469

[58] Field of Search ............... 156/173, 175, 185, 187, 156/169; 220/466, 469, 5 R; 73/49.2 T; 264/321

[56] References Cited

U.S. PATENT DOCUMENTS

| | | | |
|---|---|---|---|
| 2,767,436 | 10/1956 | Noland et al. | 264/321 |
| 4,651,893 | 3/1987 | Mooney | 73/49.2 T |
| 4,653,312 | 3/1987 | Sharp | 156/289 X |
| 4,781,777 | 11/1988 | Pugnale et al. | 156/187 |
| 4,825,687 | 5/1989 | Sharp | 73/49.2 T |
| 4,844,287 | 7/1989 | Long | 73/49.2 T |

Primary Examiner—Michael W. Ball
Assistant Examiner—Jeff H. Aftergut
Attorney, Agent, or Firm—Charles R. Wilson

[57] ABSTRACT

A method of making a jacketed storage tank comprises applying an open-cell synthetic foam over a rigid inner storage tank, applying a layer of fibrous reinforcing material on the separating agent, and applying a resinous material. The synthetic foam is at least partly sealed to prevent excessive resinous material penetration so as to maintain the continuous open-cell nature of the foam. The resultant jacket is structurally independent from the storage tank, yet is in such close proximity thereto that the resultant jacketed storage tank has an integral structural strength capable of withstanding external load forces normally encountered by underground storage tanks. Secondary containment with leak detection capability is provided.

14 Claims, 2 Drawing Sheets

METHOD OF FORMING STORAGE TANK SYSTEM HAVING SECONDARY CONTAINMENT CAPABILITY

This is a division of "Storage Tanks With Formed Jacket For, Secondary Containment", Ser. No. 07/165,153, filed Mar. 7, 1988, now U.S. Pat. No. 4,871,078, which is a continuation in-part of "Composite Storage Tanks With Secondary Containment" Ser. No. 06/853,974, filed Apr. 21, 1986 which is a continuation-in-part application of "Storage Tanks Having Formed Rigid Jacket for Secondary Containment", Ser. No. 06/824,680 filed Jan. 31 1986, now U.S. Pat. No. 4,653,312 which is a continuation in part of "Fiberglass Reinforced Resin Storage Tanks Having Secondary Containment" Ser. No. 06/745,540, filed June 17, 1985, now abandoned and a continuation in-part of "Storage Tanks Having Secondary Containment Means", Ser. No. 06/740 869. filed June 3, 1985, now U.S. Pat. No. 4,607,522, which is a continuation-in-part of "External Jacket System as Secondary Containment for Storage Tanks", Ser. No. 06/544,013, filed Oct. 21, 1983, now U.S. Pat. No. 4,523,454 and "Storage Tank Systems", filed Feb. 16, 1984, now U.S. Pat. No. 4,524,609, which is a continuation in-part of Ser. No. 06/544,012 filed Oct. 21, 1983, now abandoned.

This invention relates to a method of making storage tanks and the resultant tank More particularly, the invention relates to underground storage tanks which have a formed jacket for secondary containment means.

BACKGROUND OF THE INVENTION

Commercial and industrial storage tanks are widely used for storing a great variety of liquids. Some of these liquids are highly corrosive and/or are flammable Recent proposed regulations will soon require most storage tanks to have secondary containment means and possibly a fail safe design feature to guard against accidental soil water, and air contamination Secondary containment means must be capable of containing leaked liquid from the storage tank. Rigid double walled tanks have been suggested as one alternative. While effective for containment purposes such tanks, as presently available, are costly to build and difficult to install because of their weight. Such tanks are built by basically forming two rigid tanks utilizing different sized, reusable molds and then placing one tank inside the other.

Single and double walled tanks made from fiberglass reinforced resinous material are built using a number of distinct time consuming steps. In all known methods, a cylindrical shaped reusable mold is used to build tank halves which are subsequently assembled. Initially, layers of fiberglass followed by a resinous coating are applied to the mold or chopped fiberglass/resin streams are simultaneously directed onto the mold and subsequently cured. Sufficient applications of the fiberglass and resin are made until a wall thickness is obtained which has the desired strength. Next, support rib molds of cardboard four to six inches wide, are placed completely around the cylinder at approximately sixteen inch intervals. Fiberglass and resin are then applied over the cardboard molds and onto adjacent areas of the cylinder so as to become an integral part of the inner tank shell. The mold is finally removed. The cylindrical-shaped wall, including the ribs and one end of the tank, are produced in this stage of the method. The above steps are repeated to obtain a second half-tank. The two half-tanks are then joined together by appropriate sealing means. The resultant single walled tank is capable of being installed in the ground and in fact, is of the type which has been extensively used for the past twenty years In more recent years, double walled tanks have been built and used. Essentially, these tanks are built by the same method as the single walled tanks. An inner rigid tank is formed in the above described manner. Next, a larger diameter reusable mold is used to build a horizontal half tank The fiberglass/resin is applied in a known manner to the mold and cured to form the half tank. A second horizontal half-tank is formed. Next, the completed inner tank is placed into the larger diameter half tank. The ribs on the inner tank are properly dimensioned to act as spacer ribs between the two tanks. The second larger diameter half tank is placed over the inner tank joined and sealed at the seams with its matching half tank. The resultant product is a double walled storage tank system comprised of essentially two rigid tanks, one inside the other.

A second method of making double walled fiberglass, reinforced, resinous tanks is similar to the above method and is just as time consuming and costly In this method, the mold has a design wherein the ribs are formed as the fiberglass and resin material is applied. The mold is removed after forming the inner tank of which the ribs are an integral part thereof The interior portion of the tank next has a fiberglass/resin layer applied over the rib indentations to result in a smooth cylindrical-shaped interior A second half tank is formed in the same manner and the two halves joined A cylindrical-shaped outer tank is then formed in horizontal halves. The formed inner tank and outer tank halves are assembled as in the first method described above to form a double walled storage tank system based on two rigid tanks with support ribs there between As is readily apparent, building a double walled storage tank system by known methods is very labor extensive and costly. Recent concerns about leaked tanks has heightened the need for an efficient and economical manner of building double walled storage tank systems. A jacketed storage tank system as disclosed in my U.S. Pat. No. 4,523,454 provides secondary containment means and avoids the problems associated with the known rigid double walled systems. Additionally, the aforementioned jacket system features a fail safe design due to the fact it provides continuous monitoring means whereby the integrity of both the primary and secondary containment means are checked to insure that leakage of either containment means is known when it first occurs.

There has now been discovered methods whereby new and used storage tanks can be provided with secondary containment means in a convenient, yet economical manner. Further, used storage tanks are refurbished to a standard equivalent to that possessed by a new tank and then upgraded to have a secondary containment feature.

SUMMARY OF THE INVENTION

A method of adding secondary containment capability to a storage tank comprises the steps of (a) applying an open-cell synthetic foam as a separating agent to a rigid inner storage tank, (b) applying a layer of a fibrous reinforcing material onto the storage tank and (c) applying a resinous material onto or with the reinforcing material The open-cell synthetic foam is at least partly sealed on its outside surface to prevent excessive penetration by the resinous material. When the resinous material is cured a containment means is formed which provides secondary containment for any liquid which may leak from the storage tank. The space between the storage tank and formed jacket has a continuous space which can be monitored for any leakage.

DETAILED DESCRIPTION OF THE INVENTION

While the description to follow describes the invention in terms of its use with underground storage tanks, it should be understood the invention has applicability for other uses as well. However, the invention lends itself particularly well to underground storage tanks used for storing liquid gasoline and, therefore this preferred use is described in the following paragraphs.

Figure 1:
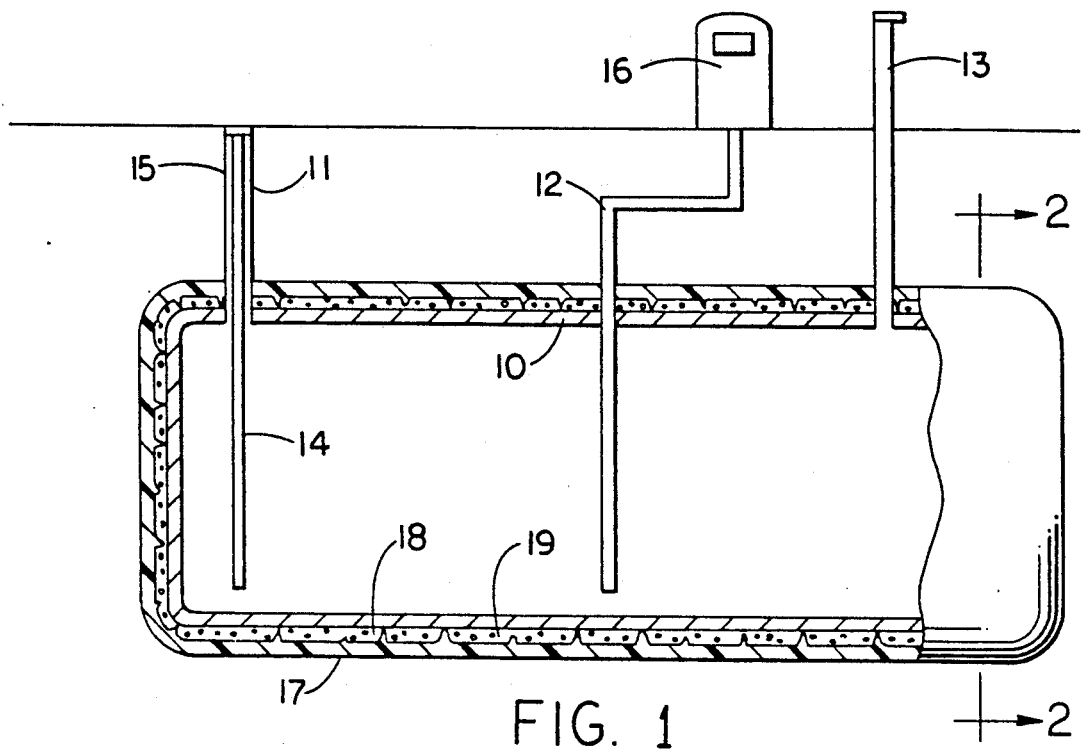
FIG. 1 is a side view in partial section of a storage tank system having a fibrous reinforced resinous material as a jacket completely surrounding the tank.
Figure 2:
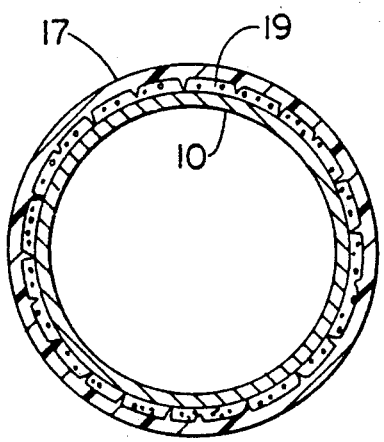
FIG. 2 is a end view of the storage tank of FIG. 1 taken along line 2—2.

Storage tanks are well known and are widely used, especially in the gasoline service station industry. They are typically made of metal or, more recently a fiberglass reinforced resin material. Either type of tank has use in this invention. A typical metal underground storage tank 10 which serves as a part of the storage tank system of this invention is shown in FIG. 1. Normally the metal used in making the tank is from about 0.15 inches to about 0.75 inches thick, depending on the tank s size and is capable of withstanding external load forces when buried underground. As better explained hereinafter, the wall thickness of the storage tank can be less than the about 0.15 inches, and preferably ranges from about 0.10 inches to about 0.40 inches. Sufficient openings are found in the storage tank 10 to allow for various access lines to communicate with the interior of the tank. As shown lines 11 12, and 13 are a fill pipe, dispensing line and vent pipe, respectively.

The fill pipe 11 provides as its obvious function the means by which gasoline can be pumped into the inner tank from an out side source, e.g. a tank truck. As illustrated in FIG. 1, fill pipe 11 comprises a line 14 through which gasoline flows to the inner tank 10 and a space 15 within the fill pipe which acts as a vapor recovery line. As gasoline is pumped into the inner tank, gasoline vapors which are formed are sucked through the space 15 back to the tank truck for recovery. This reduces the amount of gasoline vapors which would otherwise be vented to the atmosphere or remain in the inner tank preventing the tank from being filled completely with gasoline. As used throughout here the term "fill pipe" connotes the pipe by which gasoline is pumped to the tank; it can be a single pipe, but more often has vapor recovery means associated with it and is often referred to as a vapor recovery fill line. As shown in FIG. 1, line 14 extends into the inner tank 10 with its end near the bottom.

Dispensing line 12 is used for withdrawing gasoline and delivering it to the consumer through gasoline dispenser 16. While not illustrated in FIG. 1 a pump is positioned within the inner tank, dispensing line or gasoline dispenser for pumping gasoline to the dispenser. The bottom of the dispensing line 12 is in close proximity with the bottom of the inner tank 10. The vent pipe 13 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid inner tank. Outer jacket 17 provides the secondary containment enjoyed by the tanks of this invention while closed space 18 provides a means by which leakage of the inner tank and jacket can be detected.

A thin separating agent in the form of a sheet of open-cell synthetic foam 19 is initially applied to the rigid inner storage tank 10. One purpose of the synthetic foam is to ensure that a subsequently applied fibrous reinforcing material and resinous material which form the outer jacket will not adhere to the inner storage tank. It is necessary that the annular space between the cured jacket and the storage tank have a continuous open area between the two. Such annular space is closed and provides true secondary containment capability. Additionally, any sudden stress in the rigid storage tank or jacket which may cause a crack therein is less likely to be transmitted to the other because of the structural independence of the storage tank and jacket Synthetic foams used in this invention are open-celled so that a continuous open area within closed space 18 is maintained to allow migration of leaked liquid and ready detection thereof. Thus, liquid which leaks from the inner storage tank in one location will be free to migrate and be detected in a remote location of the closed space. Special precautions must be taken to ensure the open-cell nature of the synthetic foam is maintained. Prior to formation of the jacket, the synthetic foam is at least partly sealed to prevent excessive penetration of resinous material from the jacket formation step. Without the sealing, the resinous material used in the subsequent formation of the jacket will saturate the foam to effectively fill or close the cells. Partly sealing the synthetic foam in a controlled manner prevents this complete saturation.

The preferred method of partly sealing the open cell synthetic foam involves spray applying a resinous material to the outside surface of the foam. The resinous material should readily harden. Examples of such resinous materials include polyesters, vinylesters, polyalkylenes polyvinylchlorides, polyurethanes and polyepoxides. Preferably, the same resinous material used in forming the jacket is also used for partial sealing purposes. Heat sealing the outside surface of foam also effectively prevents excessive resin penetration during the jacket formation step. Any degree of sealing provides a benefit in slowing penetration of resinous material from the subsequent jacket formation from occurring. A cost savings is also achieved from use of less resinous material, but most importantly the open cell nature of the foam is maintained.

Figure 3:
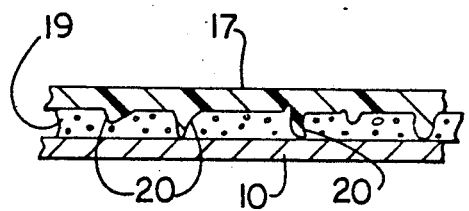
FIG. 3 is a partial side view in section of the storage tank system of FIG. 1.
Figure 4:
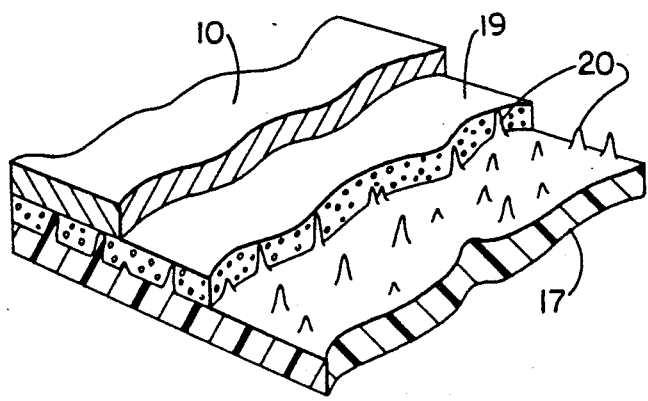
FIG. 4 is cut away partial view in perspective of a section of the storage tank system of FIG. 1.

A certain degree (less than complete) of resin penetration into the foam can be tolerated and, in certain instances, is beneficial As most evident from FIG. 3, the open-cell nature of the foam 19 allows the applied resinous sealing material to flow into the foam and can extend completely through it. This partial resin penetration followed by a cure will produce resin support columns 20. These columns will provide a degree of support preventing complete crushing of the foam material by ground forces. This is desirable in that more reliable monitoring can be accomplished if the closed space occupied by the foam material remains open around the support columns throughout and is not blocked. Sufficient resin support columns are provided to prevent a compression seal or crushing of the outer jacket onto the inner storage tank.

The open-cell synthetic foam applied over the inner storage tank has a thickness ranging from abut 0.125 inches to about 1.0 inches, preferably from about 0.125 inches to about 0.25 inches. A too thin foam, i.e. less than the about 0.125 inches, will allow the outer jacket to shrink during formation onto the rigid inner tank and/or be forced onto the rigid inner tank by compressive ground forces so as to effectively lose the continuous open area. Foam material greater than about 1.0 inch in thickness is also avoided because of increase cost without added performance benefits.

Jacket 17 is a fibrous reinforced resinous material. In one method, it is formed by first applying a layer of fibrous reinforcing material on the open-cell synthetic foam 19 found on rigid inner storage tank 10. The fibrous reinforcing material can take on many different physical shapes and structures variously referred to as mattings, nets screens, meshes, and chopped strands Examples of fibrous materials include fiberglass, nylon, and other synthetic fibrous materials. The fibrous material, if in a sheet form, can be laid onto the rigid storage tank as a continuous matting. Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride polyurethane, and polyepoxide. The listed resinous materials used in the construction of this jacket are not all inclusive, but only illustrative of some of the resinous materials which can be used.

Alternatively, the fibrous material is applied in the form of chopped strands with the resinous materials described in the previous paragraph. That is, the chopped strand and resinous material are sprayed from separate nozzles of the same spray gun and the jacket formed therefrom on the separating agent as the resin cures. Other known methods of forming a fibrous reinforced resin substance can be used.

The shape of the resultant jacket is such that it encases the rigid inner storage tank to form a closed annular space 18. However, the jacket is not a structural part of the inner tank because of the synthetic foam acting as a separating agent. The jacket itself is capable of containing any liquid which is stored in the storage tank and which has leaked therefrom.

The strength of the jacketed storage tank has sufficient structural integrity to withstand external load forces normally encountered by underground storage tanks without suffering cracking or collapsing. As used herein cracking is defined to means the jacket structurally tears apart to the extent a liquid will at least seep there through. Slight surface deformation scan be tolerated; however, deflections of greater than about two inches from the norm would be considered a collapse. The strength of either jacket or storage tank is not important; rather it is the system's integral structural strength which is important. The integral structural strength results from the jacket's close proximity to the tank. The adequate strength combined with the light weight of the total system makes the system of this invention particularly attractive. Additionally, the secondary containment satisfies a demonstrated need. The jacket is capable of holding over 100% by volume of the liquid stored in inner storage tank 10.

Figure 5:
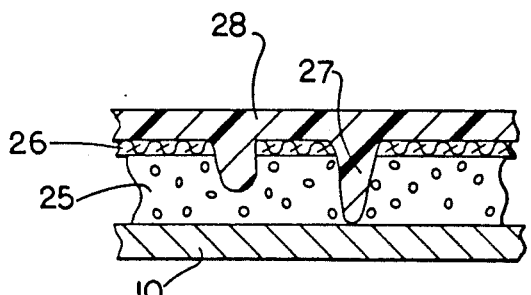
FIG. 5 is a partial side view of a storage tank system of the invention wherein a fabric backed foam material has been used.

In a preferred embodiment of the invention shown in FIG. 5, the open-cell synthetic foam 25 is provided with a fibrous backing 26. It has been found that the liquid resinous materials used in sealing and jacket formation tend to cause the synthetic foam to warp or distort. The fibrous backing helps the foam to maintain its dimensional stability. Preferably, the fibrous backing is on the outside surface of the foam, though can as well be the inside surface adjacent the rigid inner tank. The fibrous material must itself be pervious to liquid so as not to interfere with the migration and detection of leaked liquid. Examples of suitable fibrous backings include woven fabrics, nets, and screens made of natural and/or synthetic materials. The backing is preferably embedded in the foam's surface during formation and is in effect an integral part of it. Jacket 28 is formed in the manner described above with respect to FIG. 1.

Figure 6:
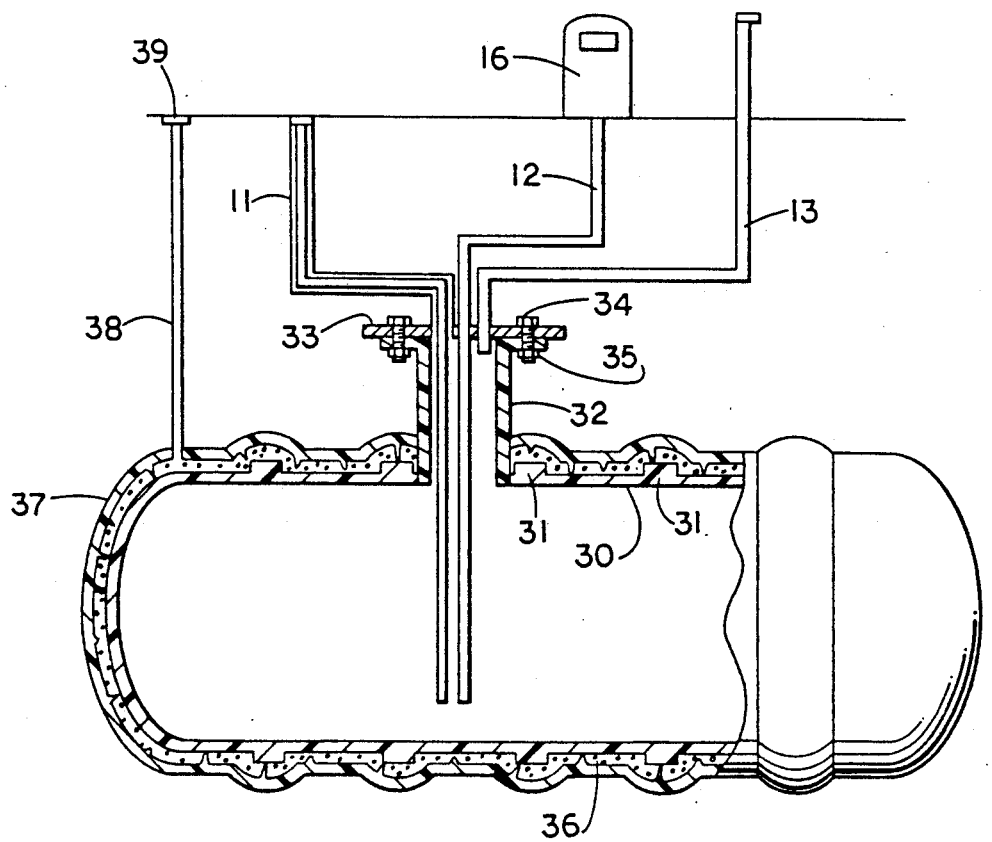
FIG. 6 is a side view of a typical fiberglass reinforced resinous storage tank having support ribs surrounding the tank and a jacket of a fibrous reinforced resinous material surrounding the storage tank.

FIG. 6 illustrates use of a typical fiberglass reinforced resinous rigid inner storage tank 30 in making the system of this invention. Such inner tanks are formed with supporting ribs 31 circumferentially surrounding the tank. A man way 32 allows for ready access to the tank's interior for repair or inspection work. The tank's interior is sealed by means of a cover 33 on the man way with bolts 34 and nuts 35. The ribs 31 act as supports so that the weight of the tank, including the contents therein are evenly distributed and add strength needed to withstand earth load stresses. This unique construction has necessitated special fabrications with prior art vaulted storage tanks based on two rigid shells. An advantage of this invention is that the fibrous reinforcing material can be laid over the open-cell synthetic foam 36, covered ribs 31, and the resinous material applied without any special steps to accommodate the ribs 31. The subsequently formed jacket 37 which conforms substantially to the contour of the rigid tank is not only capable of holding any leaked liquid but also is capable of withstanding external load forces without breaking. The jacket's close proximity to the storage tank allows forces applied to the jacket to be transmitted to the storage tank. The steps of applying the fiberglass reinforcing material and the resinous material are the same as described above with respect to the metal storage tank of FIG. 1.

The space between the jacket and the storage tank 10 can be monitored. As shown in FIG. 6, an access tube 38 extends from ground level through the jacket so as to be in communication with the closed space. Any of well known and commercially available monitor means can be used. For example, the closed space can be filled with a detecting liquid. This detecting liquid can be placed in the closed space by the manufacturer of the tank due to the fact the closed space between the storage tank and jacket occupies a small volume, e.g. about 25–100 gallons detecting liquid is sufficient for use with storage tanks having a capacity of from about 10,000 to about 20,000 gallons. At the end of the access tube is a sight glass 39. Whenever leakage occurs, a change in the level or color of a detecting liquid will occur and will be readily observed in the sight glass. Instead of the sight glass and visual observation of a change in level or color of detecting liquid, non-visual leak detection means such as pressure transducers or float controls can be used to detect a change in level.

Alternatively, the closed space can be placed either under anon-atmospheric pressure, i.e. a positive or negative air pressure. Detection means associated with the closed space is capable of detecting any change in pressure resulting from the leak in the jacket or the storage tank. Conventional air pump or vacuum pump, together with an associated pressure regulator can be used. A pressure change sensor 31 is a part of the detection means. A pressure gauge serves this purpose adequately. Optionally, an alarm system can be electronically linked with the pressure sensor to audibly or visually warn of a pre-set significant pressure change. Gas pervious material 19 maintains a spaced relationship between the inner tank and the jacket when a vacuum is used as well as serves as the separating agent.

Another embodiment of the detection means utilizes an analyzer capable of detecting the liquid being stored. Thus, the detection means comprises the analyzer which is in communication with the closed space. Preferably, a vacuum means for withdrawing gaseous material from the closed space is used for the purpose of obtaining a sample.

Still another detection means utilizes a probe which extends through an access tube so as to monitor for leakage, preferably at or near the bottom of the closed space. The probe is capable of detecting pre-selected liquids or gases. In this embodiment, the separating agent can be a gas pervious material whereby leakage will ultimately seep or wick to the bottom of the closed space and be detected or a solid which is stored liquid-, e.g. gasoline-soluble or water-soluble. Such solid separating agents will ultimately be solubilized and the leakage detected by the probe.

The invention herein has been described with particular reference to the drawings. It should be understood other variations of the invention are within the scope of coverage.

What is claimed is:

1. A method of forming a composite storage tank system having secondary containment capability with the added capability of detecting leakage, said storage tank system having sufficient integral structural strength to withstand external load forces, comprising the steps of:
   (a) applying an open-cell synthetic foam as a separating agent to a rigid inner storage tank so that a subsequently formed jacket will not adhere to the tank and become a part thereof, said synthetic foam further characterized in being at least partly sealed on its outside surface to retard penetration of a subsequently applied liquid resinous material from impairing the gas pervious nature of the synthetic foam;
   (b) applying a fibrous reinforcing material and resinous material completely around the storage tank and onto the synthetic foam so that when cured a jacket is formed wherein resin support columns extend from the underside of the jacket, said jacket being independent of the storage tank so that a continuous closed space is created for the purpose of detecting leakage through the inner storage tank or jacket, yet is in such close proximity to the inner tank that said jacket and inner tank reinforce one another to achieve the integral structural strength.

2. The method of claim 1 wherein the thickness of the synthetic foam is such that external forces are transferred from the jacket through the support columns to the rigid inner storage tank.

3. The method of claim 2 wherein the open-cell synthetic foam has a thickness of from about 0.125 inches to about 1.0 inch.

4. The method of claim 3 wherein the open-cell synthetic foam has a thickness of from about 0.125 inches to about 0.25 inches.

5. The method of claim 3 wherein the open-cell synthetic foam is at least partially sealed with a resinous material.

6. The method of claim 5 wherein the open-cell synthetic foam is at least partly sealed with the same resinous material as is used in forming the jacket.

7. The method of claim 5 wherein the open-cell synthetic foam is at least partly sealed by spraying a resinous material onto the foam in a controlled manner so that said resinous material partially penetrates the foam and when hardened the support columns of resinous material are formed.

8. The method of claim 5 wherein the open-cell synthetic foam has a fabric backing to help maintain the foam's dimensional stability when the resinous material is applied.

9. The method of claim 1 wherein the storage tank is made of a fiberglass reinforced resinous material.

10. The method of claim 9 wherein the storage tank has support ribs surrounding its circumference so as to withstand external forces when buried underground and the jacket substantially conforms to the contour of the storage tank.

11. The method of claim 1 wherein the storage tank is a metal tank having walls ranging in thickness of from about 0.10 inches to about 0.40 inches.

12. The method of claim 1 wherein the fibrous reinforcing material is fiberglass.

13. The method of claim 1 wherein the open-cell synthetic foam is a polyurethane foam or polyester foam.

14. The method of claim 1 wherein the open-cell synthetic foam is heat sealed.

* * * * *